US008375913B2

(12) United States Patent
Kwiecinski et al.

(10) Patent No.: US 8,375,913 B2
(45) Date of Patent: Feb. 19, 2013

(54) VEHICLE HAVING REMOTE START AND CARBON MONOXIDE DETECTION

(75) Inventors: Robert Kwiecinski, Saline, MI (US); Brian Bennie, Sterling Heights, MI (US); Thomas M. McQuade, Ann Arbor, MI (US); Daniel J. Bartz, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 711 days.

(21) Appl. No.: 12/535,369

(22) Filed: Aug. 4, 2009

(65) Prior Publication Data

US 2011/0030639 A1 Feb. 10, 2011

(51) Int. Cl.

| | |
|---|---|
| ***F02N 11/08*** | (2006.01) |
| ***G08B 17/10*** | (2006.01) |
| ***B60L 1/00*** | (2006.01) |
| ***B60L 3/00*** | (2006.01) |
| ***H02G 3/00*** | (2006.01) |

(52) U.S. Cl. ..................... 123/179.2; 340/632; 307/10.1

(58) Field of Classification Search ............. 123/179.28, 123/179.3, 179.4, 179.2; 290/1 A, 1 B; 307/10.6, 307/9.1, 10.1, 118, 326, 327, 328; 49/31; 60/276; 73/114.69, 114.71; 340/632; 701/109, 701/113

See application file for complete search history.

(56) References Cited

U.S. PATENT DOCUMENTS

| | | | | |
|---|---|---|---|---|
| 6,040,636 | A * | 3/2000 | DiCroce | 307/10.1 |
| 6,983,726 | B1 | 1/2006 | Luo et al. | |
| 7,167,791 | B2 | 1/2007 | Kappauf et al. | |
| 7,342,368 | B2 | 3/2008 | Roman | |
| 7,474,943 | B2 * | 1/2009 | Matsubara et al. | 701/2 |
| 2003/0098784 | A1 * | 5/2003 | Van Bosch et al. | 340/425.5 |
| 2004/0160329 | A1 * | 8/2004 | Flanc | 340/632 |
| 2007/0146150 | A1 * | 6/2007 | Calabrese et al. | 340/632 |
| 2008/0068208 | A1 * | 3/2008 | Hanselman | 340/825.72 |
| 2008/0284579 | A1 * | 11/2008 | Contreras | 340/501 |
| 2009/0251325 | A1 * | 10/2009 | Smith et al. | 340/632 |

FOREIGN PATENT DOCUMENTS

CA 2258884 A1 * 7/2000

* cited by examiner

*Primary Examiner* — Stephen K Cronin
*Assistant Examiner* — Sizo Vilakazi
(74) *Attorney, Agent, or Firm* — Frank MacKenzie MacMillan, Sobanski & Todd LLC

(57) ABSTRACT

The subject of the present invention is a method for remote starting an internal combustion engine of a vehicle that may include: detecting a wireless remote start signal; after detecting the wireless remote start signal, activating a carbon monoxide detector to detect a level of carbon monoxide adjacent to the vehicle; remote starting the internal combustion engine if the detected level of carbon monoxide is less than a predetermined first CO limit; disabling remote start of the internal combustion engine if the level of carbon monoxide is not less than the predetermined first CO limit; and automatically transmitting an emergency aid signal if the level of carbon monoxide is not less than the predetermined first CO limit.

3 Claims, 2 Drawing Sheets

VEHICLE HAVING REMOTE START AND CARBON MONOXIDE DETECTION

BACKGROUND OF THE INVENTION

The present invention relates generally to vehicles having remote start (remote engine start) capabilities, and more particularly to vehicles having remote start capabilities with carbon monoxide detection.

Vehicle technologies exist that allow for remote starting of vehicles. For example, a key fob may include a button that, when pushed, transmits a signal to the vehicle causing the internal combustion engine to start. Vehicle operators find this feature handy because a heater or air conditioner can be activated with the engine in order to heat or cool the vehicle before the operator enters the vehicle.

One concern with remote start, however, is that the vehicle may be parked in a garage with the garage door closed or other enclosed space when the remote start signal is sent. Moreover, since the remote start button is on a key fob with the vehicle operator, the operator may not realize that the vehicle is in the enclosed space (such as a garage with the door closed) when activating the remote start function. Because internal combustion engines produce exhaust gasses that are undesirable for humans to breathe, it is undesirable for vehicle engines to run while the vehicle is parked in a closed garage or other space where exhaust gasses can build up rather than escape to atmosphere.

SUMMARY OF THE INVENTION

An embodiment contemplates a method for remote starting an internal combustion engine of a vehicle comprising the steps of: detecting a wireless remote start signal; after detecting the wireless remote start signal, activating a carbon monoxide detector to detect a level of carbon monoxide adjacent to the vehicle; remote starting the internal combustion engine if the detected level of carbon monoxide is less than a predetermined first CO limit; disabling remote start of the internal combustion engine if the level of carbon monoxide is not less than the predetermined first CO limit; and automatically transmitting an emergency aid signal if the level of carbon monoxide is not less than the predetermined first CO limit.

An embodiment contemplates a method for remote starting an internal combustion engine of a vehicle comprising the steps of: (a) detecting a wireless remote start signal; (b) after detecting the wireless remote start signal, detecting a first level of carbon monoxide adjacent to the vehicle; (c) remote starting the internal combustion engine if the detected first level of carbon monoxide is less than a predetermined first CO limit; (d) disabling remote start of the internal combustion engine if the first level of carbon monoxide is not less than the predetermined first CO limit; (e) transmitting a garage door open signal if the first level of carbon monoxide is not less than the predetermined first CO limit; (f) if the first level of carbon monoxide is not less than the first CO limit, then after steps (d) and (e), detecting a second level of carbon monoxide adjacent to the vehicle; and (g) automatically transmitting an emergency aid signal if the second level of carbon monoxide is not less than a predetermined second CO limit.

An advantage of an embodiment is the reduced chance that exhaust gasses will build up in an enclosed space due to exhaust emanating from a remotely started vehicle. Moreover, should exhaust gasses reach an unacceptable level, then an automatic alert for assistance is issued.

DETAILED DESCRIPTION

Figure 1:
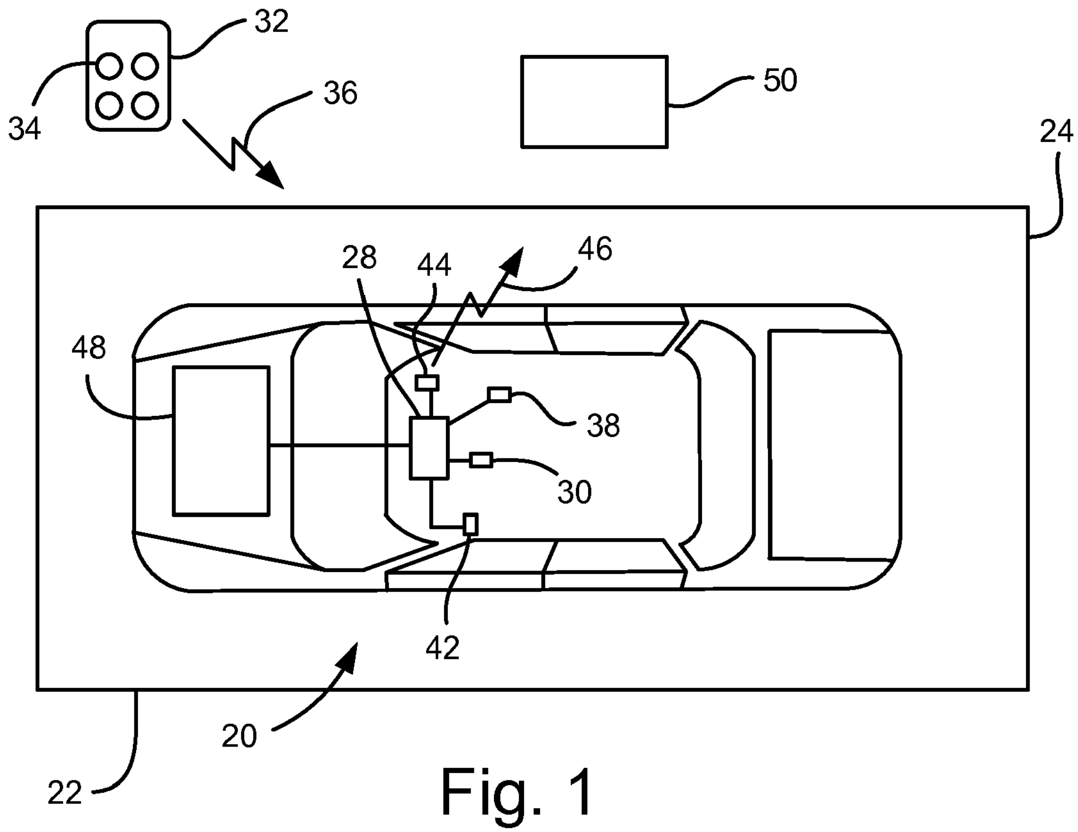
FIG. 1 shows a schematic, plan view of a vehicle parked in an enclosed structure, such as a garage.
Figure 2:
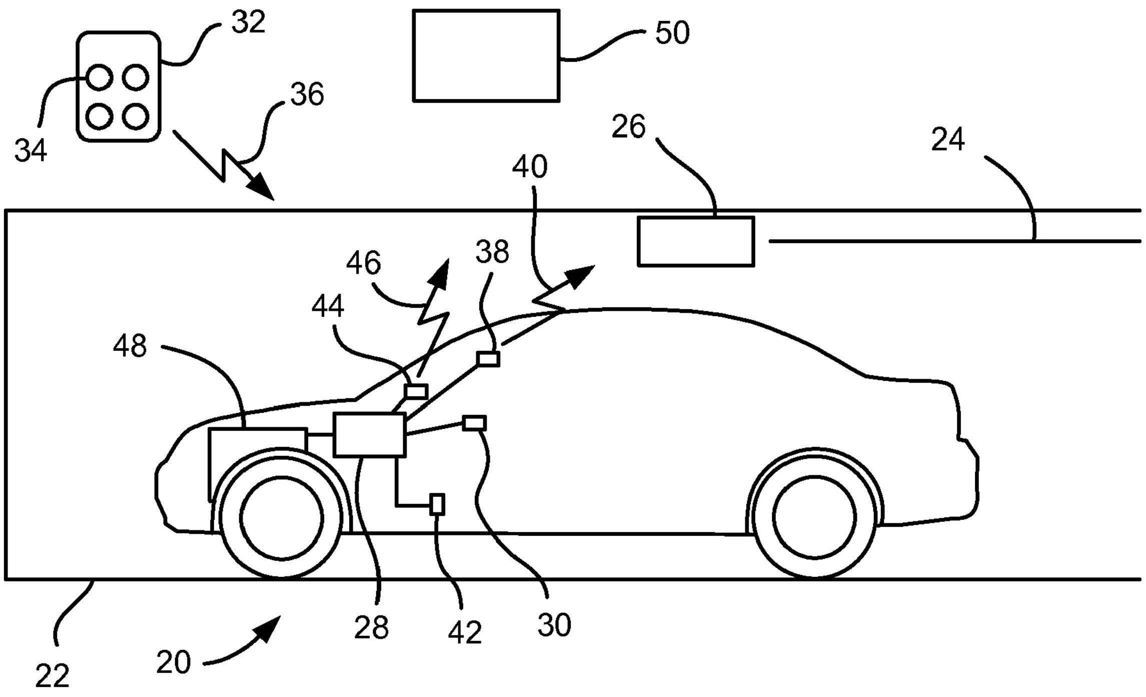
FIG. 2 shows a schematic, side elevation view of the vehicle and enclosure of FIG. 1.

FIGS. 1 and 2 show a vehicle 20 that is parked in an enclosed structure, such as a garage 22, which includes a garage door 24 that is movable between a closed position (shown in FIG. 1) and an open position (shown in FIG. 2) that allows the vehicle 20 to enter/exit the garage 22. The garage 22 may also include a garage door opener 26 (shown in FIG. 2) that can receive a signal and cause the garage door 24 to open and close.

The vehicle 20 includes a controller 28, which is sometimes called an engine control unit or a powertrain control unit. The controller 28 may made up of various combinations of hardware and software as is known to those skilled in the art. The controller 28 may be in communication with a remote engine start receiver 30 (or transceiver) that receives wireless signals 36 from a key fob 32 having a remote start button 34. The controller 28 may also be in communication with a garage door opener transmitter 38 that can transmit wireless signals 40 to the garage door opener 26 to cause the garage door 24 to open and close. The controller 28 also controls the starting and stopping of an internal combustion engine 48.

A carbon monoxide (CO) detector 42 is mounted on the vehicle 20 and in communication with the controller 28. Also, an emergency aid transmitter 44 is mounted on the vehicle 20 and in communication with the controller 28. The transmitter 44 is capable of transmitting a wireless signal 46 to an emergency aid system 50. The emergency aid system 50 may be, for example, one that communicates through a cell phone network to a call center, where the vehicle 20 is located via a cell tower network or via a GPS system in the vehicle 20, with local assistance being summoned to the vehicle, such as an emergency 911 call being placed.

Figure 3:
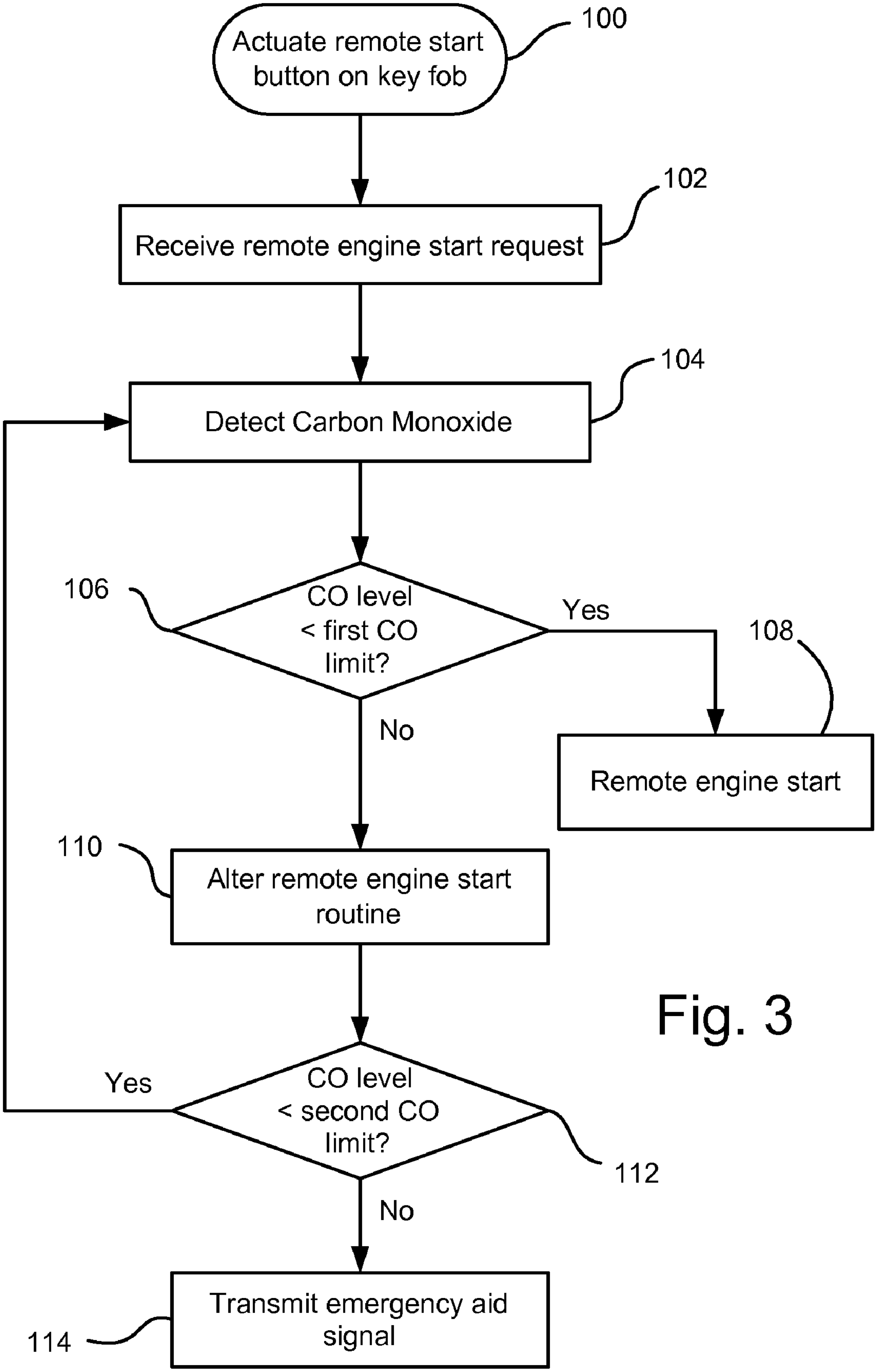
FIG. 3 is a flow chart illustrating a method of remote starting a vehicle that may be parked in an enclosed structure.

The operation of the vehicle of FIGS. 1 and 2 will now be described with respect to the flow chart of FIG. 3. Upon actuation of the remote start button 34 on the key fob 32, block 100, the remote start signal 36 is transmitted from the fob 32 and, if within range, received by the remote engine start receiver 30 in the vehicle 20. The engine start receiver 30 alerts the controller 28, block 102. Upon receiving the remote start signal 36, the carbon monoxide (CO) detector 42 is also activated to determine the level of carbon monoxide, block 104.

If the CO sensor 42 detects a CO level that is less than a first predetermined CO limit, block 106, then the controller 28 will proceed with the remote engine start, block 108. If the CO level is not less than the first predetermined CO limit, block 106, then the controller 28 will alter the remote engine start routine accordingly, block 110. This altering of the remote engine start may take the form of sending a garage door open signal 40 from the garage door opener transmitter 38 and disabling the remote engine start. The CO level is compared to a second CO limit, block 112. There may be a predetermined amount of time that is allowed to lapse between the alternate remote start engine routine, block 110, and the comparison of the CO level to the second CO limit, block 112, in order to allow some of the CO to escape to atmosphere. The second CO limit may be the same as the first CO limit, or the second CO level may be higher than the first CO level, in which case the higher level may one that warrants more immediate action. In either event, if the CO level is less than the second CO limit, block 112, then the routine may return to block 104 to again determine if remote start of the engine is warranted. If the CO level is not less than the second CO limit, block 112, then an emergency aid signal 46 is automatically transmitted, block 114, to the emergency aid system 50.

Alternatively, if the CO level is not less than the first CO limit, block 106, then the altering of the remote engine start routine, block 110, may include transmitting an emergency aid signal 46 and disabling the remote engine start, with or without opening the garage door and without checking the CO level against a second CO limit.

While certain embodiments of the present invention have been described in detail, those familiar with the art to which this invention relates will recognize various alternative designs and embodiments for practicing the invention as defined by the following claims.

What is claimed is:

1. A method for remote starting an internal combustion engine of a vehicle comprising the steps of:

(a) detecting a wireless remote start signal;

(b) after detecting the wireless remote start signal, detecting a first level of carbon monoxide adjacent to the vehicle;

(c) remote starting the internal combustion engine if the detected first level of carbon monoxide is less than a predetermined first CO limit;

(d) disabling remote start of the internal combustion engine if the first level of carbon monoxide is not less than the predetermined first CO limit;

(e) transmitting a garage door open signal if the first level of carbon monoxide is not less than the predetermined first CO limit;

(f) if the first level of carbon monoxide is not less than the first CO limit, then after steps (d) and (e), detecting a second level of carbon monoxide adjacent to the vehicle, the first CO limit being less than the second level of carbon monoxide; and (g) automatically transmitting an emergency aid signal if the second level of carbon monoxide is not less than a predetermined second CO limit.

2. The method of claim 1 wherein step (g) is further defined by transmitting a wireless signal from an emergency aid transmitter located in the vehicle to a cellular telephone network.

3. The method of claim 1 wherein step (f) is further defined by waiting a predetermined time after step (e) before detecting the second level of carbon monoxide.

* * * * *